(12) United States Patent
Vah et al.

(10) Patent No.: US 12,423,944 B2
(45) Date of Patent: Sep. 23, 2025

(54) SECURITY-RELATED IMAGE PROCESSING USING ARTIFICIAL INTELLIGENCE TECHNIQUES

(71) Applicant: Dell Products L.P, Round Rock, TX (US)

(72) Inventors: Jeffrey Scott Vah, Round Rock, TX (US); Ravi Shukla, Bengaluru (IN); An Chung, Austin, TX (US); Jim Henry Wiggers, Cedar Park, TX (US); Aditi Saluja, Bryan, TX (US)

(73) Assignee: Dell Products L.P., Round Rock, TX (US)

( * ) Notice: Subject to any disclaimer, the term of this patent is extended or adjusted under 35 U.S.C. 154(b) by 381 days.

(21) Appl. No.: 18/105,961

(22) Filed: Feb. 6, 2023

(65) Prior Publication Data
US 2024/0265671 A1    Aug. 8, 2024

(51) Int. Cl.
*G06V 10/74* (2022.01)
*G06V 10/75* (2022.01)
*G06V 10/82* (2022.01)

(52) U.S. Cl.
CPC .......... *G06V 10/751* (2022.01); *G06V 10/761* (2022.01); *G06V 10/82* (2022.01)

(58) Field of Classification Search
CPC ..... G06V 10/751; G06V 10/761; G06V 10/82
See application file for complete search history.

(56) References Cited

U.S. PATENT DOCUMENTS

| | | | |
|---|---|---|---|
| 8,448,859 B2 | 5/2013 | Goncalves et al. | |
| 9,652,658 B1 | 5/2017 | McCormick et al. | |
| 10,936,866 B2 | 3/2021 | Berger et al. | |
| 12,254,668 B1* | 3/2025 | Stoian | G06V 10/443 |
| 2014/0270362 A1* | 9/2014 | Najafi Shoushtari | G06V 10/752 382/103 |
| 2016/0342863 A1* | 11/2016 | Kwon | G06V 10/454 |
| 2019/0180086 A1* | 6/2019 | Zhang | G06V 10/50 |
| 2019/0195939 A1* | 6/2019 | Noh | G01R 31/28 |

* cited by examiner

*Primary Examiner* — John Villecco
*Assistant Examiner* — Han Hoang
(74) *Attorney, Agent, or Firm* — Ryan, Mason & Lewis, LLP

(57) ABSTRACT

Methods, apparatus, and processor-readable storage media for security-related image processing using artificial intelligence techniques are provided herein. An example computer-implemented method includes obtaining image data associated with at least one user-provided component; obtaining identifier data associated with the at least one user-provided component; obtaining image data associated with at least one reference component from at least one database using at least a portion of the obtained identifier data; performing a comparison, using at least one pretrained computer vision model, of at least a portion of the obtained image data associated with the at least one user-provided component and at least a portion of the obtained image data associated with the at least one reference component; and performing one or more security-related actions based at least in part on results of the comparison.

20 Claims, 7 Drawing Sheets

SECURITY-RELATED IMAGE PROCESSING USING ARTIFICIAL INTELLIGENCE TECHNIQUES

FIELD

The field relates generally to information processing systems, and more particularly to techniques for providing security in such systems.

BACKGROUND

In connection with general operations of many enterprises, hardware and other physical components are returned due to alleged defects. However, in some instances, alternate and/or incorrect items are returned in an attempt to defraud a given enterprise. Also, conventional fraud detection approaches typically include visual inspection of returned items by human agents, labor-intensive and error-prone processes which can result in non-trivial resource losses for the given enterprise.

SUMMARY

Illustrative embodiments of the disclosure provide security-related image processing using artificial intelligence techniques.

An exemplary computer-implemented method includes obtaining image data associated with at least one user-provided component, obtaining identifier data associated with the at least one user-provided component, and obtaining image data associated with at least one reference component from at least one database using at least a portion of the obtained identifier data. Additionally, the method includes performing a comparison, using at least one pretrained computer vision model, of at least a portion of the obtained image data associated with the at least one user-provided component and at least a portion of the obtained image data associated with the at least one reference component. Further, the method also includes performing one or more security-related actions based at least in part on results of the comparison.

Illustrative embodiments can provide significant advantages relative to conventional fraud detection approaches. For example, problems associated with labor-intensive and error-prone processes are overcome in one or more embodiments through automatically processing component image data using at least one pretrained computer vision model.

These and other illustrative embodiments described herein include, without limitation, methods, apparatus, systems, and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
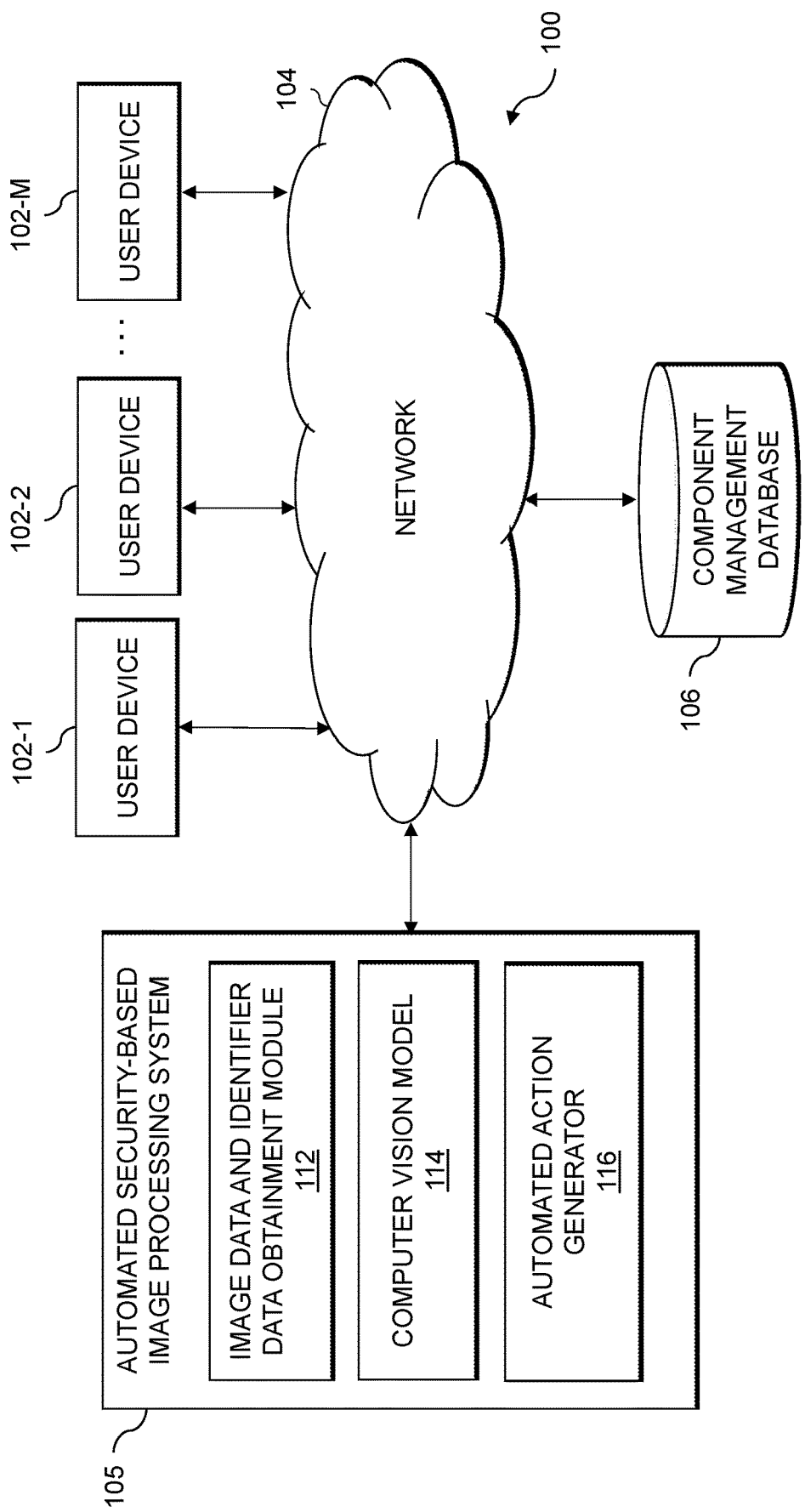
FIG. 1 shows an information processing system configured for security-related image processing using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated security-based image processing system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated security-based image processing system 105 can have an associated component management database 106 configured to store data pertaining to component images, which comprise, for example, authenticated component images, associated component identifier information, etc.

The component management database 106 in the present embodiment is implemented using one or more storage systems associated with automated security-based image processing system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated security-based image processing system 105 are one or more input-output devices, which illustratively comprise keyboards, displays, camera devices or other types of input-output devices in any combination. Such input-output devices can be used, for example, to support one or more user interfaces to automated security-based image processing system 105, as well as to support communication between automated security-based image processing system 105 and other related systems and devices not explicitly shown.

Additionally, automated security-based image processing system 105 in the FIG. 1 embodiment is assumed to be implemented using at least one processing device. Each such processing device generally comprises at least one processor and an associated memory, and implements one or more functional modules for controlling certain features of automated security-based image processing system 105.

More particularly, automated security-based image processing system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated security-based image processing system 105 to communicate over the network 104 with the user devices 102, and illustratively comprises one or more conventional transceivers.

The automated security-based image processing system 105 further comprises image data and identifier data obtainment module 112, computer vision model 114, and automated action generator 116.

It is to be appreciated that this particular arrangement of elements 112, 114 and 116 illustrated in the automated security-based image processing system 105 of the FIG. 1 embodiment is presented by way of example only, and alternative arrangements can be used in other embodiments. For example, the functionality associated with elements 112, 114 and 116 in other embodiments can be combined into a single module, or separated across a larger number of modules. As another example, multiple distinct processors can be used to implement different ones of elements 112, 114 and 116 or portions thereof.

At least portions of elements 112, 114 and 116 may be implemented at least in part in the form of software that is stored in memory and executed by a processor.

It is to be understood that the particular set of elements shown in FIG. 1 for security-related image processing using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated security-based image processing system 105 and component management database 106 can be on and/or part of the same processing platform.

An exemplary process utilizing elements 112, 114 and 116 of an example automated security-based image processing system 105 in computer network 100 will be described in more detail with reference to the flow diagram of FIG. 5.

Accordingly, at least one embodiment includes security-related image processing using artificial intelligence techniques. For example, such an embodiment can include performing real-time fraud assessment using at least one deep learning image similarity technique based at least in part on an image embedding approach. By way merely of illustration, such an embodiment can include automating a fraudulent component identification process by performing validation of one or more components (such as, for example, at least one printed circuit board (PCB) assembly (e.g., at least one motherboard)), provided and/or returned by at least one user to an enterprise as allegedly defective, prior to processing such a component for repair at one or more associated enterprise locations. The validation can include, for example, using at least one computer vision model that processes input component images in conjunction with reference component images and outputs similarity scores based at least in part on differences found therebetween. Further, based at least in part on such similarity scores, determinations and/or predictions can be made as to whether the provided and/or returned components are fraudulent.

One or more embodiments include facilitating and/or enabling proactive and automated fraud identification earlier in one or more enterprise service lifecycles than conventional approaches. Additionally or alternatively, at least one embodiment can include implementing such proactive and automated fraud identification throughout multiple portions of one or more enterprise service lifecycles. By way merely of illustration, in a first example use case, an on-site field technician can implement the techniques detailed herein to identify a fraudulent component at a customer's site, prior to replacing the allegedly defective component, resulting in non-trivial resource savings. In a second example use case, an operator at a component receiving station associated with the enterprise can implement the techniques detailed herein to detect fraudulent components prior to sending the components to one or more component repair-related locations associated with the enterprise, thereby reducing costs associated with skilled repair technician time.

Figure 2:
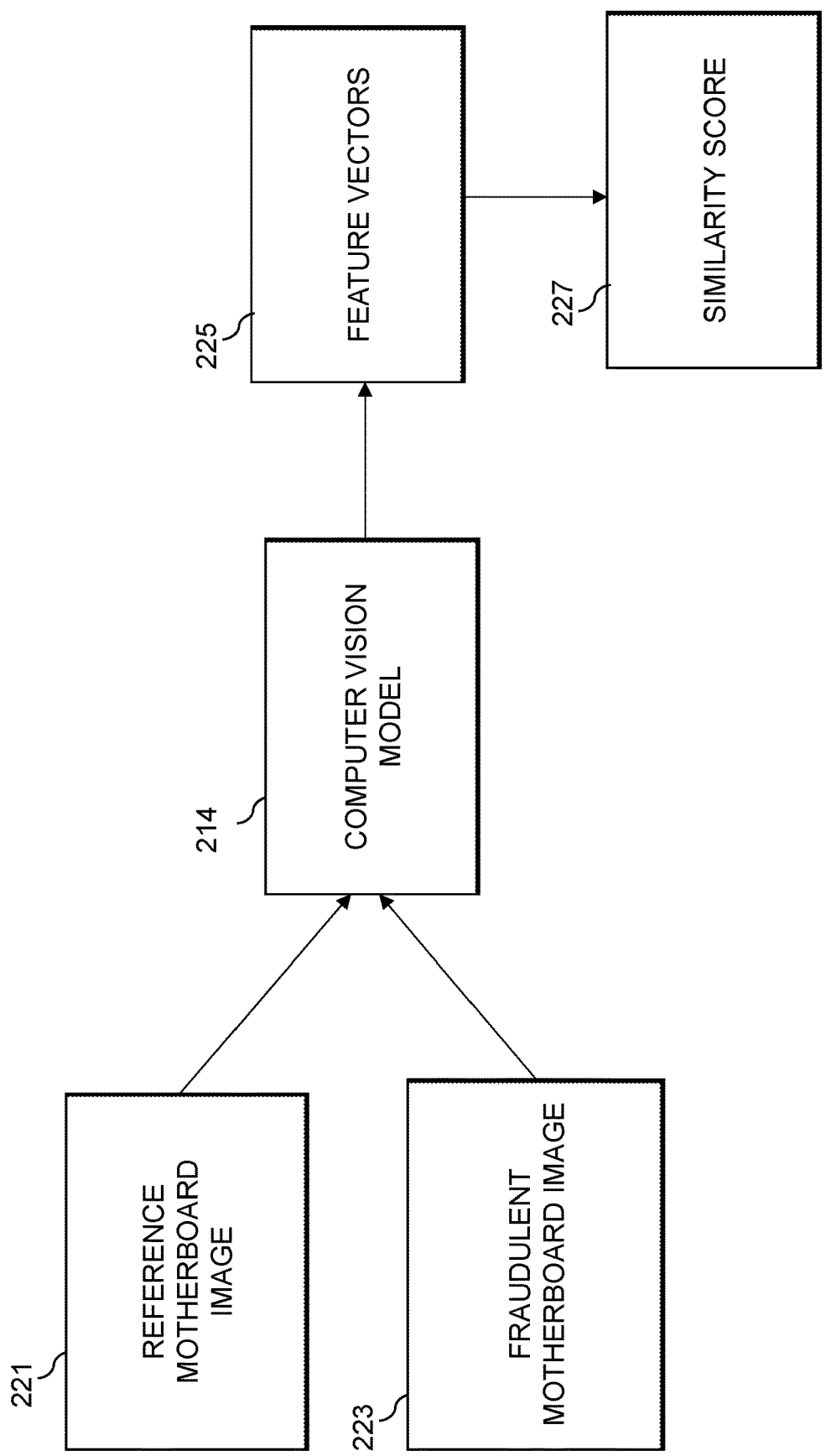
FIG. 2 shows an example workflow in accordance with an illustrative embodiment.

FIG. 2 shows an example workflow in accordance with an illustrative embodiment. By way of illustration, FIG. 2 depicts a reference motherboard image 221 and a fraudulent motherboard image 223, both provided to computer vision model 214, which processes the images and generates one or more feature vectors 225 associated with the images (e.g., 4096 length feature vectors). By way merely of example, a VGG16 model can convert an image into one or more feature vectors, wherein each feature vector comprises a set of numerical values. The size of the vectors depends at least in part on the model used. In the case of a VGG16 model, for example, typically an image is converted to a feature vector size of 4096 (i.e., 4096 numerical values).

As also depicted in FIG. 2, based at least in part on comparison of at least a portion of the generated feature vectors 225, a similarity score 227 (i.e., representing at least one level of similarity between reference motherboard image 221 and fraudulent motherboard image 223) is generated. In at least one embodiment, such a similarity score 227 can include a cosine similarity score, a Euclidean distance score, a Manhattan distance score, etc. Additionally, in one or more embodiments, computer vision model 214 can include a pre-trained computer vision model (e.g., pre-trained using reference and/or authenticated component images) such as, for example, a model based on at least one convolutional neural network (e.g., a VGG16 model that is trained on multiple images (e.g., millions of images across thousands of categories)).

Accordingly, and as further detailed in connection with FIG. 3, one or more embodiments can include using machine vision techniques to automate fraud detection (e.g., at receiving stations, at customer sites, etc.) without human intervention.

Figure 3:
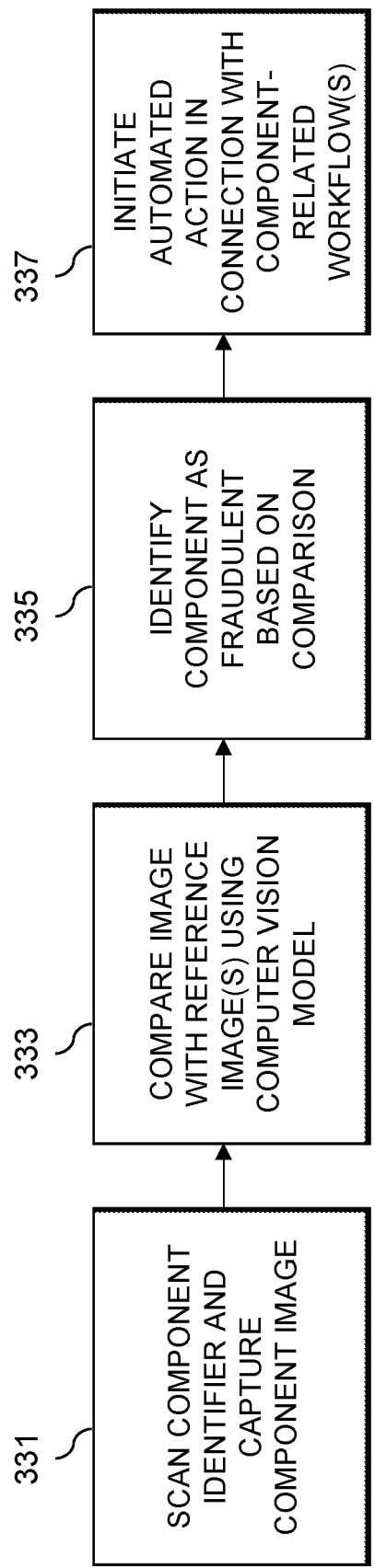
FIG. 3 shows an example workflow in accordance with an illustrative embodiment.

FIG. 3 shows an example workflow in accordance with an illustrative embodiment. As depicted in FIG. 3, step 331 includes scanning at least one component identifier (e.g., a serial number, a piece part identification (PPID), etc.) of a given component (e.g., a motherboard) and capturing at least one image of the given component. Step 333 includes comparing the at least one captured image with one or more reference images using a computer vision model, and step 335 includes identifying the component as fraudulent (e.g., before further processing the component with respect to one or more related workflows (e.g., repair workflows, replacement workflows, etc.)) based at least in part on the comparison performed in step 333. Further, step 337 includes initiating one or more automated actions in connection with one or more component-related workflows. By way merely of example, once components are identified as fraudulent, the components may be routed to at least one specialist for confirmation and/or may be segregated from non-fraudulent components for further processing.

By way merely of example, the example workflow depicted in FIG. 3 can be carried out by a user device (e.g., an enterprise operator's device (e.g., a smart phone, a tablet, smart glasses, etc.) on-site at a customer location, an agent's device at a third-party component repair facility, etc.), such that the user device carries out step 331 using one or more physical components (e.g., a camera) of the device, and subsequently carries out steps 333, 335 and 337 using related software resident on any edge device, wherein the processing is performed locally on the device or remotely using edge computing-based techniques (e.g., via the Cloud).

Figure 4:
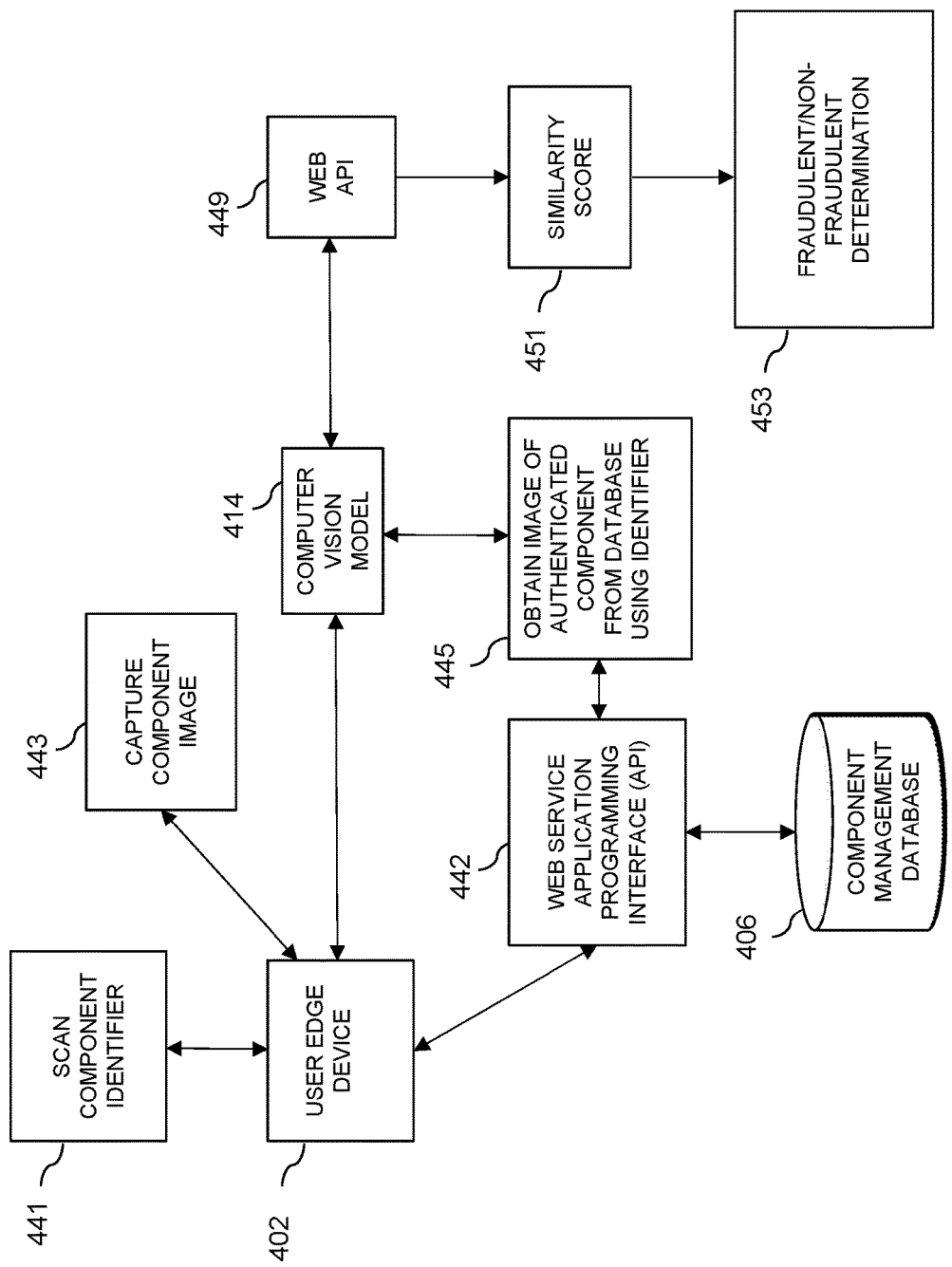
FIG. 4 shows an example edge computing workflow for fraud detection in an illustrative embodiment.

FIG. 4 shows an example edge computing workflow for fraud detection in an illustrative embodiment. By way of illustration, FIG. 4 depicts an alternative approach (e.g., from the workflow depicted in FIG. 3) using edge computing-based techniques for performing early fraud detection. For example, user edge device 402 (e.g., a device of an operator at a third-party repair facility) scans one or more component identifiers (e.g., serial number, PPID, etc.) in step 441 and captures one or more images of a given component returned from the field (e.g., from a customer location) in step 443.

FIG. 4 also depicts component management database 406, which contains component images of various angles and/or orientations (e.g., front views, back views, side views, etc.) representing true and/or authenticated components. Also, FIG. 4 depicts a web service application programming interface (API) 442, which is implemented to make an API call (e.g., from user edge device 402) to fetch one or more desired images from the component management database 406 using the one or more scanned component identifiers (scanned in step 441 by user edge device 402) via step 445. The obtained reference image(s) is fed to computer vision model 414 deployed on an edge device (e.g., user edge device 402) such as a smartphone, a tablet, smart glasses, etc., wherein computer vision model 414 performs on-device image comparison of the input image(s) captured in step 443 and the reference image(s) obtained from component management database 406 in step 445. Such image comparison results in the computer vision model 414 generating, via web API 449, a determination and/or prediction as to whether the input image(s) captured in step 443 is fraudulent or not, in step 453, based on at least one similarity score 451 calculated by comparing images captured in steps 443 and 445. In one or more embodiments, if the compute and/or storage resources of the given edge device (e.g., user edge device 402) are insufficient to carry out one or more of the above-noted steps, then, optionally, the images can be processed by a Cloud server for computation of the similarity score.

In at least one embodiment, a downstream machine learning model for binary classification can be trained with data such as, for example, [embedding vector1, embedding vector2, cosine similarity], wherein embedding vector1 and embedding vector2 represent learned feature vectors for reference and fraudulent component images to be used in connection with predicting whether a fraudulent component or an authentic and/or correct component has been/is being returned.

Accordingly, one or more embodiments include providing real time fraud detection for components returned within at least one supply chain by comparing one or more mechanical characteristics, contour-related information, physical layout of the component, etc., with at least one reference image using at least one deep learning-based image embedding technique. In such an embodiment, a reference image and a fraudulent component image are both passed through and/or processed using a pre-trained computer vision model (e.g., a VGG16 model) which learns one or more features and/or aspects of both components (e.g., motherboards). These learned features are represented as embeddings which are then compared against each other using at least one similarity measure (e.g., cosine similarity). In at least one embodiment, the learned features are converted from at least one image format to vector embeddings (represented as numerical data) using a pre-trained model such as VGG16, such that the embeddings can be compared and differences can be evaluated accordingly.

Additionally, at least one embodiment includes processing of images (input images and/or reference images) taken in any orientation (e.g., front angle, back angle, side angle, overhead view, etc.), eliminating fixturing and allowing for flexibility in image capture conditions (e.g., different lightning conditions, different backgrounds, etc.). Also, one or more embodiments includes providing photographic evidence for a chain of custody of components and identifying at least one source of fraud at any touchpoint in a given supply chain and/or reverse logistics process (e.g., a customer's site, a logistics entity, a third-party repair facility, etc.).

Further, at least one embodiment includes implementing one or more image similarity techniques such as, for example, one or more external image similarity APIs, at least one oriented fast and rotated brief similarity technique, at least one contour matching technique, and one or more image embedding vector-based techniques.

By way merely of illustration, an example use can include preprocessing images (e.g., input images and/or reference images) using grayscale image techniques and/or a single-color channel. After the preprocessing, numerical representations of the images are generated and the numerical representations are converted to a size (e.g., 224, 224, 3) required for input to a pre-trained VGG16 model. Next, the vector representation of the images is passed through the pre-trained VGG16 model to generate a resultant vector (e.g., a resultant vector of size 4096). In at least one embodiment, before loading the pre-trained VGG16 model, a final softmax layer can be removed from the model, and the output of the dense layer feature vector size can be set to 4096.

After the image embeddings are generated, cosine similarity values are calculated between input component image embeddings and reference image embeddings. In at least one embodiment, the cosine similarity used to compare vector x and vector y can be represented as follows:

$$\cos(x, y) = (x \cdot y)/(\|x\| * \|y\|)$$

In one or more embodiments, such a cosine similarity calculation provides a value in the range of [0, 1], wherein 0 represents not similar and 1 represents completely similar. By way merely of example, such an embodiment can include setting the cosine similarity threshold value at, for example, 0.6, which defines data points with cosine similarity values less than 0.6 being treated as fraudulent, while data points with cosine similarity values greater than 0.6 being treated as correct and/or matching images.

It is to be appreciated that some embodiments described herein utilize one or more artificial intelligence models. It is to be appreciated that the term "model," as used herein, is intended to be broadly construed and may comprise, for example, a set of executable instructions for generating computer-implemented determinations and/or predictions. For example, one or more of the models described herein may be trained to generate determinations and/or predictions based on reference image data associated with various hardware components, and such determinations and/or predictions can be used to initiate one or more automated actions (e.g., automatically adjusting and/or terminating one or more component-related service workflows, automatically transmitting communications to one or more users associated with such determinations and/or predictions, etc.).

Figure 5:
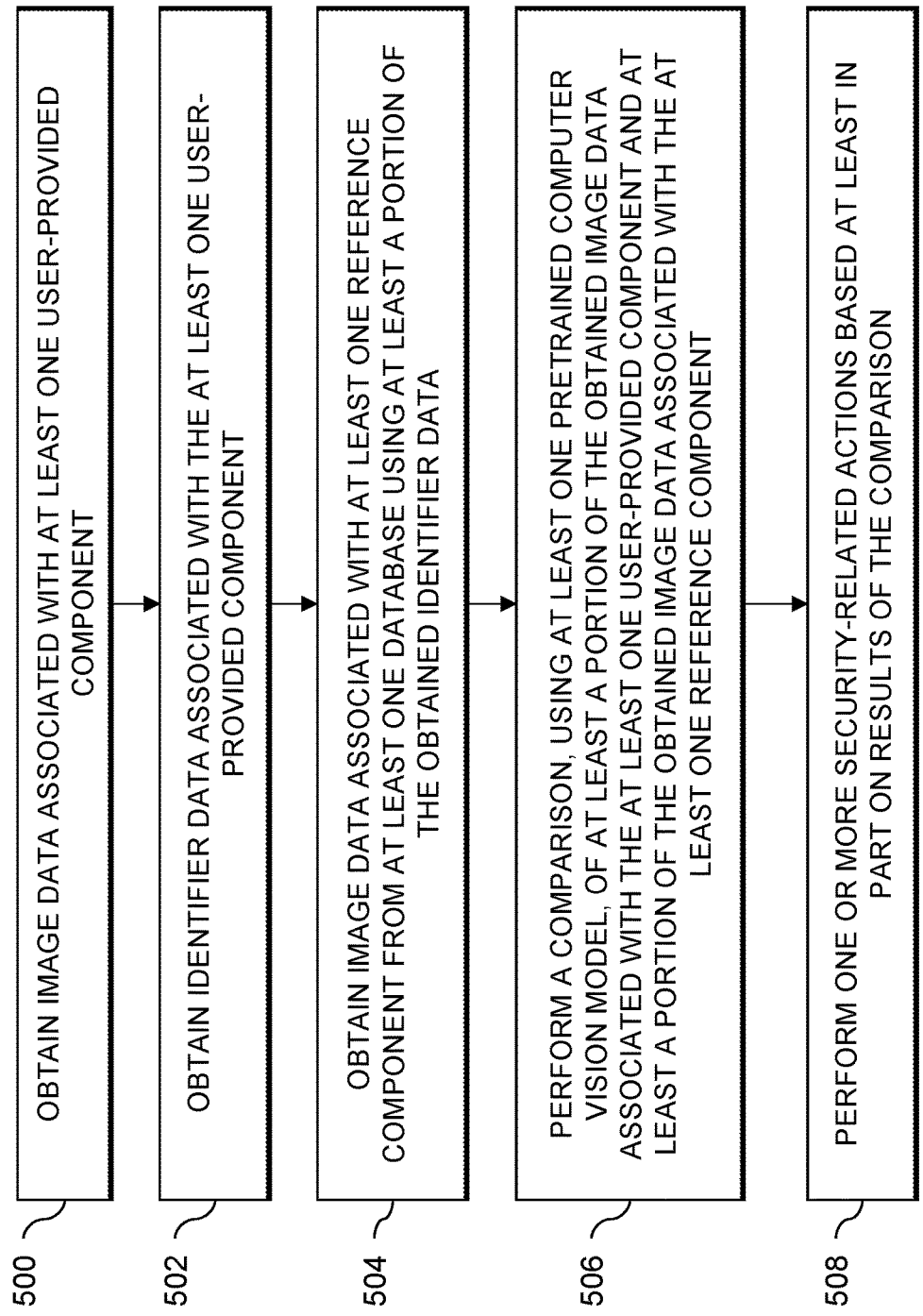
FIG. 5 is a flow diagram of a process for security-related image processing using artificial intelligence techniques in an illustrative embodiment.

FIG. 5 is a flow diagram of a process for security-related image processing using artificial intelligence techniques in an illustrative embodiment. It is to be understood that this particular process is only an example, and additional or alternative processes can be carried out in other embodiments.

In this embodiment, the process includes steps 500 through 508. These steps are assumed to be performed by the automated security-based image processing system 105 utilizing elements 112, 114 and 116.

Step 500 includes obtaining image data associated with at least one user-provided component. In at least one embodiment, obtaining image data associated with the at least one user-provided component includes processing image orientation data attributed to the obtained image data associated with the at least one user-provided component and/or processing data related to one or more image capture conditions attributed to the obtained image data associated with the at least one user-provided component.

Step 502 includes obtaining identifier data associated with the at least one user-provided component. Step 504 includes obtaining image data associated with at least one reference component from at least one database (e.g., component management database 106 in the FIG. 1 embodiment) using at least a portion of the obtained identifier data.

Step 506 includes performing a comparison, using at least one pretrained computer vision model, of at least a portion of the obtained image data associated with the at least one user-provided component and at least a portion of the obtained image data associated with the at least one reference component. In one or more embodiments, the at least one computer vision model includes at least one convolutional neural network (e.g., a VGG16 model).

Additionally or alternatively, performing the comparison can include generating a numerical representation of the at least a portion of the obtained image data associated with the at least one user-provided component and a numerical representation of the at least a portion of the obtained image data associated with the at least one reference component, and converting the generated numerical representations to a size and/or format compatible to the at least one pretrained computer vision model. Such an embodiment can also include generating an image embedding of the at least a portion of the obtained image data associated with the at least one user-provided component and an image embedding of the at least a portion of the obtained image data associated with the at least one reference component by processing the generated numerical representations using the at least one pretrained computer vision model, and performing a comparison of generated image embeddings. Further, in one or more embodiments, performing the comparison includes using the at least one pretrained computer vision model in connection with component contour matching.

Step 508 includes performing one or more security-related actions based at least in part on results of the comparison. In at least one embodiment, performing one or more security-related actions includes automatically generating a similarity score, using one or more similarity measures, between the obtained image data associated with the at least one user-provided component and the obtained image data associated with the at least one reference component. Such an embodiment can also include initiating one or more component-related workflows based at least in part on the generated similarity score. Additionally or alternatively, generating a similarity score can include automatically generating a cosine similarity score between the obtained image data associated with the at least one user-provided component and the obtained image data associated with the at least one reference component.

Further, in one or more embodiments, performing one or more security-related actions can include automatically training at least a portion of the at least one pretrained computer vision model based at least in part on feedback pertaining to the results of the comparison.

Accordingly, the particular processing operations and other functionality described in conjunction with the flow diagram of FIG. 5 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to provide security-related image processing using artificial intelligence techniques. These and other embodiments can effectively overcome problems associated with conventional fraud detection approaches.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 6 and 7. Although described in the context of system 100, these platforms may also be used to implement at least portions of other information processing systems in other embodiments.

Figure 6:
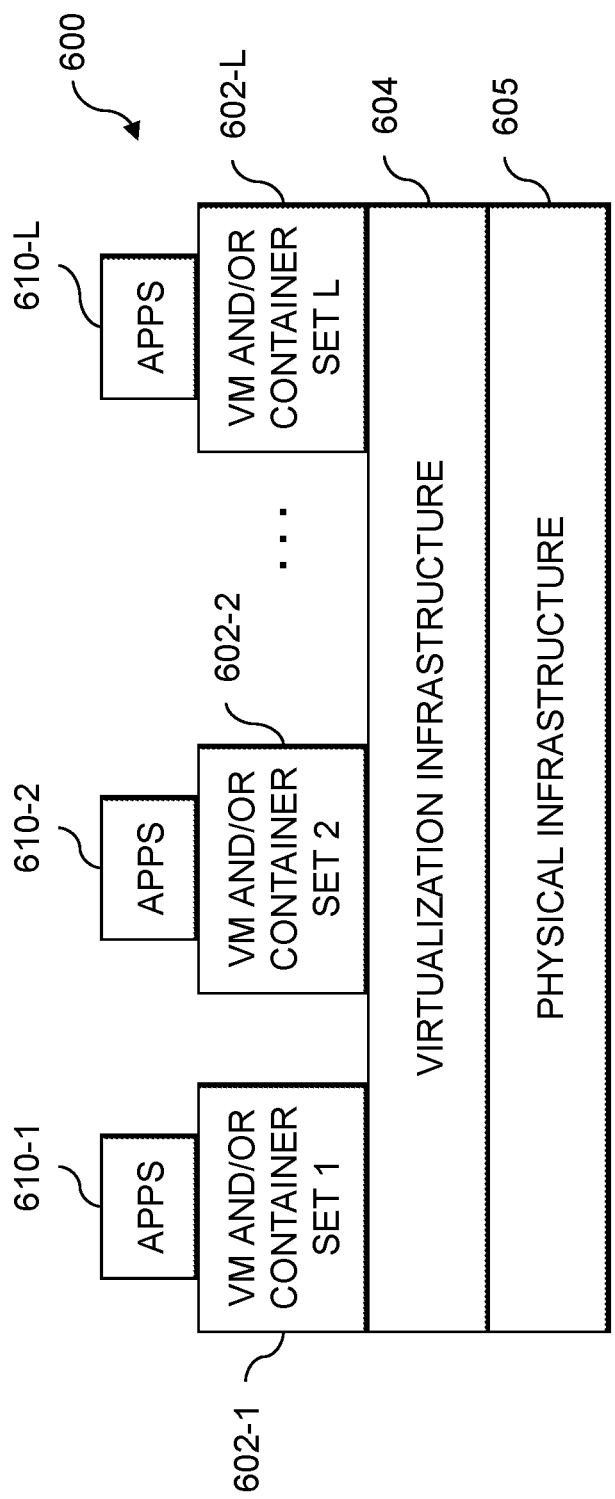
FIGS. 6 and 7 show examples of processing platforms that may be utilized to implement at least a portion of an information processing system in illustrative embodiments.
Figure 7:
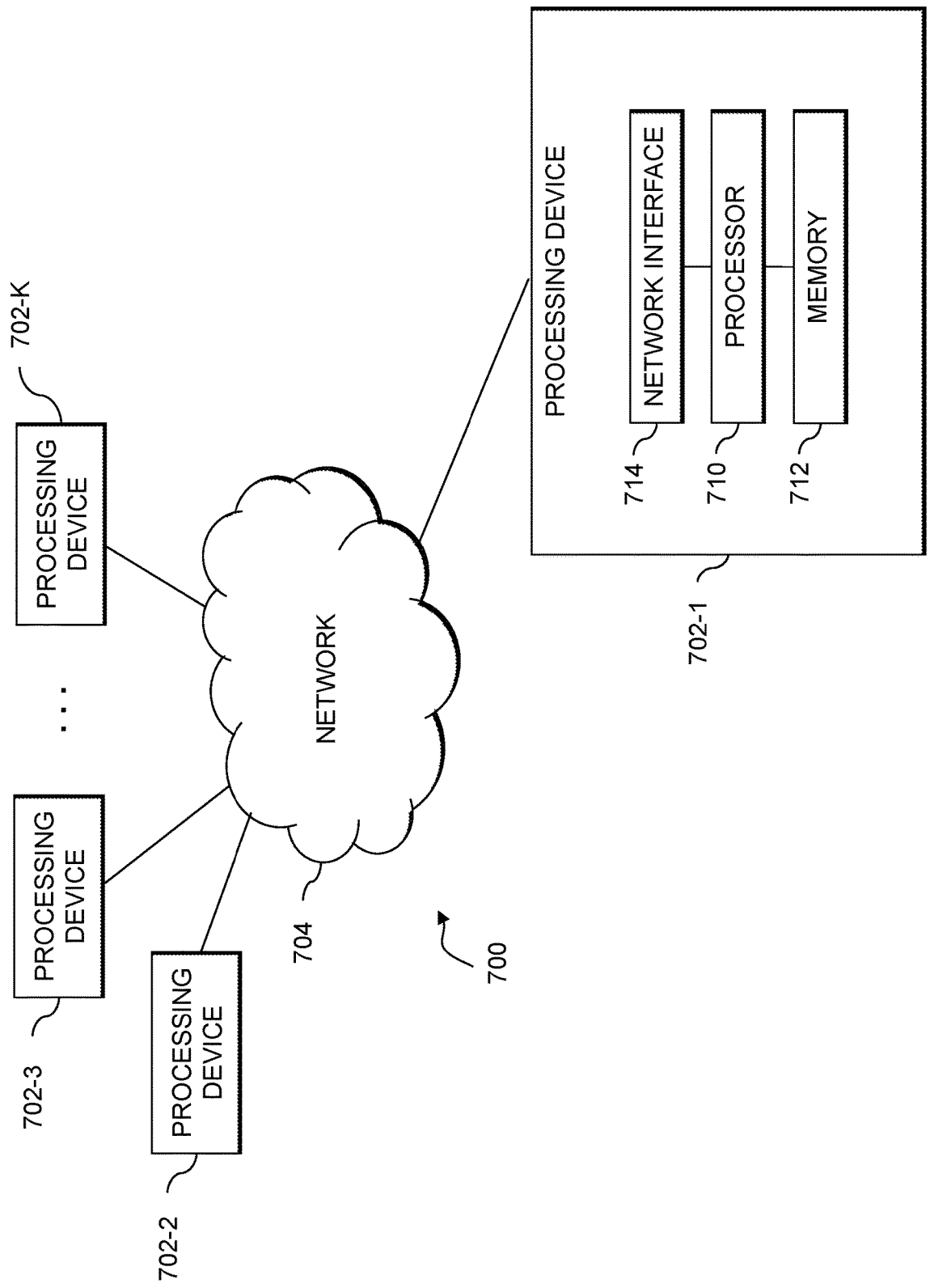

FIG. 6 shows an example processing platform comprising cloud infrastructure 600. The cloud infrastructure 600 comprises a combination of physical and virtual processing resources that are utilized to implement at least a portion of the information processing system 100. The cloud infrastructure 600 comprises multiple virtual machines (VMs) and/or container sets 602-1, 602-2, . . . 602-L implemented using virtualization infrastructure 604. The virtualization infrastructure 604 runs on physical infrastructure 605, and illustratively comprises one or more hypervisors and/or operating system level virtualization infrastructure. The operating system level virtualization infrastructure illustratively comprises kernel control groups of a Linux operating system or other type of operating system.

The cloud infrastructure 600 further comprises sets of applications 610-1, 610-2, . . . 610-L running on respective ones of the VMs/container sets 602-1, 602-2, . . . 602-L under the control of the virtualization infrastructure 604. The VMs/container sets 602 comprise respective VMs, respective sets of one or more containers, or respective sets of one or more containers running in VMs. In some implementations of the FIG. 6 embodiment, the VMs/container sets 602 comprise respective VMs implemented using virtualization infrastructure 604 that comprises at least one hypervisor.

A hypervisor platform may be used to implement a hypervisor within the virtualization infrastructure 604, wherein the hypervisor platform has an associated virtual infrastructure management system. The underlying physical machines comprise one or more information processing platforms that include one or more storage systems.

In other implementations of the FIG. 6 embodiment, the VMs/container sets 602 comprise respective containers implemented using virtualization infrastructure 604 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, . . . 702-K, which communicate with one another over a network 704.

The network 704 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 702-1 in the processing platform 700 comprises a processor 710 coupled to a memory 712.

The processor 710 comprises a microprocessor, a CPU, a GPU, a TPU, a microcontroller, an ASIC, a FPGA or other type of processing circuitry, as well as portions or combinations of such circuitry elements.

The memory 712 comprises random access memory (RAM), read-only memory (ROM) or other types of memory, in any combination. The memory 712 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:

obtaining computer hardware image data associated with at least one user-provided computer hardware component;

processing first image orientation data attributed to the obtained computer hardware image data associated with the at least one user-provided computer hardware component;

obtaining identifier data associated with the at least one user-provided computer hardware component;

obtaining computer hardware image data associated with at least one reference computer hardware component from at least one database using at least a portion of the obtained identifier data;

processing second image orientation data attributed to the obtained computer hardware image data associated with the at least one reference computer hardware component;

performing a comparison, using at least one pretrained computer vision model, of at least a portion of the obtained computer hardware image data and the processed first image orientation data associated with the at least one user-provided computer hardware component and at least a portion of the obtained computer hardware image data and the processed second image orientation data associated with the at least one reference computer hardware component; and performing one or more security-related actions based at least in part on results of the comparison;

wherein the method is performed by at least one processing device comprising a processor coupled to a memory.

2. The computer-implemented method of claim 1, wherein performing the comparison comprises:
   generating a numerical representation of the at least a portion of the obtained computer hardware image data and the processed first image orientation data associated with the at least one user-provided computer hardware component and a numerical representation of the at least a portion of the obtained computer hardware image data and the processed first image orientation data associated with the at least one reference computer hardware component; and
   converting the generated numerical representations to a size compatible to the at least one pretrained computer vision model.

3. The computer-implemented method of claim 2, wherein performing the comparison comprises:
   generating an image embedding of the at least a portion of the obtained computer hardware image data and the processed first image orientation data associated with the at least one user-provided computer hardware component and an image embedding of the at least a portion of the obtained computer hardware image data and the processed second image orientation data associated with the at least one reference computer hardware component by processing the generated numerical representations using the at least one pretrained computer vision model; and
   performing a comparison of generated image embeddings.

4. The computer-implemented method of claim 1, wherein obtaining computer hardware image data associated with the at least one user-provided computer hardware component comprises obtaining data related to one or more image capture conditions attributed to the obtained computer hardware image data associated with the at least one user-provided computer hardware component.

5. The computer-implemented method of claim 1, wherein the at least one pretrained computer vision model comprises at least one convolutional neural network.

6. The computer-implemented method of claim 1, wherein performing one or more security-related actions comprises automatically generating a similarity score, using one or more similarity measures, between the obtained computer hardware image data and the processed first image orientation data associated with the at least one user-provided computer hardware component and the obtained computer hardware image data and the processed second image orientation data associated with the at least one reference computer hardware component.

7. The computer-implemented method of claim 6, wherein performing one or more security-related actions comprises initiating one or more component-related workflows based at least in part on the generated similarity score.

8. The computer-implemented method of claim 6, wherein automatically generating a similarity score comprises automatically generating a cosine similarity score between the obtained computer hardware image data and the processed first image orientation data associated with the at least one user-provided computer hardware component and the obtained computer hardware image data and the processed second image orientation data associated with the at least one reference computer hardware component.

9. The computer-implemented method of claim 1, wherein performing the comparison comprises using the at least one pretrained computer vision model in connection with component contour matching.

10. The computer-implemented method of claim 1, wherein performing one or more security-related actions comprises automatically training at least a portion of the at least one pretrained computer vision model based at least in part on feedback pertaining to the results of the comparison.

11. A non-transitory processor-readable storage medium having stored therein program code of one or more software programs, wherein the program code when executed by at least one processing device causes the at least one processing device:
   to obtain computer hardware image data associated with at least one user-provided computer hardware component;
   to process first image orientation data attributed to the obtained computer hardware image data associated with the at least one user-provided computer hardware component;
   to obtain identifier data associated with the at least one user-provided computer hardware component;
   to obtain computer hardware image data associated with at least one reference computer hardware component from at least one database using at least a portion of the obtained identifier data;
   to process second image orientation data attributed to the obtained computer hardware image data associated with the at least one reference computer hardware component;
   to perform a comparison, using at least one pretrained computer vision model, of at least a portion of the obtained computer hardware image data and the processed first image orientation data associated with the at least one user-provided computer hardware component and at least a portion of the obtained computer hardware image data and the processed second image orientation data associated with the at least one reference computer hardware component; and
   to perform one or more security-related actions based at least in part on results of the comparison.

12. The non-transitory processor-readable storage medium of claim 11, wherein performing the comparison comprises:
   generating a numerical representation of the at least a portion of the obtained computer hardware image data and the processed first image orientation data associated with the at least one user-provided computer hardware component and a numerical representation of the at least a portion of the obtained computer hardware image data and the processed first image orientation data associated with the at least one reference computer hardware component; and
   converting the generated numerical representations to a size compatible to the at least one pretrained computer vision model.

13. The non-transitory processor-readable storage medium of claim 12, wherein performing the comparison comprises:
   generating an image embedding of the at least a portion of the obtained computer hardware image data and the processed first image orientation data associated with the at least one user-provided computer hardware component and an image embedding of the at least a portion of the obtained computer hardware image data and the processed second image orientation data associated with the at least one reference computer hardware component by processing the generated numerical representations using the at least one pretrained computer vision model; and performing a comparison of generated image embeddings.

14. The non-transitory processor-readable storage medium of claim 11, wherein performing one or more security-related actions comprises automatically generating a similarity score, using one or more similarity measures, between the obtained computer hardware image data and the processed first image orientation data associated with the at least one user-provided computer hardware component and the obtained computer hardware image data and the processed second image orientation data associated with the at least one reference computer hardware component.

15. The non-transitory processor-readable storage medium of claim 14, wherein performing one or more security-related actions comprises initiating one or more component-related workflows based at least in part on the generated similarity score.

16. An apparatus comprising:
at least one processing device comprising a processor coupled to a memory;
the at least one processing device being configured:
to obtain computer hardware image data associated with at least one user-provided computer hardware component;
to process first image orientation data attributed to the obtained computer hardware image data associated with the at least one user-provided computer hardware component;
to obtain identifier data associated with the at least one user-provided computer hardware component;
to obtain computer hardware image data associated with at least one reference computer hardware component from at least one database using at least a portion of the obtained identifier data;
to process second image orientation data attributed to the obtained computer hardware image data associated with the at least one reference computer hardware component;
to perform a comparison, using at least one pretrained computer vision model, of at least a portion of the obtained computer hardware image data and the processed first image orientation data associated with the at least one user-provided computer hardware component and at least a portion of the obtained computer hardware image data and the processed second image orientation data associated with the at least one reference computer hardware component; and
to perform one or more security-related actions based at least in part on results of the comparison.

17. The apparatus of claim 16, wherein performing the comparison comprises:
generating a numerical representation of the at least a portion of the obtained computer hardware image data and the processed first image orientation data associated with the at least one user-provided computer hardware component and a numerical representation of the at least a portion of the obtained computer hardware image data and the processed first image orientation data associated with the at least one reference computer hardware component; and
converting the generated numerical representations to a size compatible to the at least one pretrained computer vision model.

18. The apparatus of claim 17, wherein performing the comparison comprises:
generating an image embedding of the at least a portion of the obtained computer hardware image data and the processed first image orientation data associated with the at least one user-provided computer hardware component and an image embedding of the at least a portion of the obtained computer hardware image data and the processed second image orientation data associated with the at least one reference computer hardware component by processing the generated numerical representations using the at least one pretrained computer vision model; and
performing a comparison of generated image embeddings.

19. The apparatus of claim 16, wherein performing one or more security-related actions comprises automatically generating a similarity score, using one or more similarity measures, between the obtained computer hardware image data and the processed first image orientation data associated with the at least one user-provided computer hardware component and the obtained computer hardware image data and the processed second image orientation data associated with the at least one reference computer hardware component.

20. The apparatus of claim 16, wherein performing the comparison comprises using the at least one pretrained computer vision model in connection with component contour matching.

* * * * *